United States Patent
Ren et al.

(10) Patent No.: US 12,464,475 B2
(45) Date of Patent: Nov. 4, 2025

(54) SIDELINK TRANSMISSION OF CROSS-LINK INTERFERENCE INFORMATION BY A VICTIM USER EQUIPMENT

(71) Applicant: QUALCOMM Incorporated, San Diego, CA (US)

(72) Inventors: Yuwei Ren, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/757,991

(22) PCT Filed: Jan. 13, 2020

(86) PCT No.: PCT/CN2020/071783
§ 371 (c)(1),
(2) Date: Jun. 24, 2022

(87) PCT Pub. No.: WO2021/142578
PCT Pub. Date: Jul. 22, 2021

(65) Prior Publication Data
US 2023/0030518 A1   Feb. 2, 2023

(51) Int. Cl.
*H04W 52/24* (2009.01)
*H04W 72/541* (2023.01)

(52) U.S. Cl.
CPC ....... *H04W 52/243* (2013.01); *H04W 72/541* (2023.01)

(58) Field of Classification Search
None
See application file for complete search history.

(56) References Cited

U.S. PATENT DOCUMENTS

| 2016/0242188 | A1* | 8/2016 | Tiirola | H04L 5/14 |
| 2017/0013628 | A1* | 1/2017 | Kim | H04W 76/14 |
| 2018/0270835 | A1* | 9/2018 | Chen | H04W 72/0446 |

(Continued)

FOREIGN PATENT DOCUMENTS

| CN | 108289311 A | 7/2018 |
| CN | 109891983 A | 6/2019 |

(Continued)

OTHER PUBLICATIONS

Supplementary European Search Report—EP20913133—Search Authority—The Hague—Oct. 11, 2023.

(Continued)

*Primary Examiner* — Clemence S Han
(74) *Attorney, Agent, or Firm* — Harrity & Harrity LLP/Qualcomm Incorporated

(57) ABSTRACT

Various aspects of the present disclosure generally relate to wireless communication. In some aspects, a victim user equipment (UE) may measure a cross-link interference strength from an aggressor UE based at least in part on an uplink transmission from the aggressor UE colliding with a downlink transmission to the victim UE. The victim UE may transmit cross-link interference information to the aggressor UE on a sidelink channel. For example, the cross-link interference information transmitted to the aggressor UE may indicate at least the cross-link interference strength measured by the victim UE. Numerous other aspects are provided.

35 Claims, 7 Drawing Sheets

(56) References Cited

U.S. PATENT DOCUMENTS

| | | | | |
|---|---|---|---|---|
| 2019/0260486 A1* | 8/2019 | Kang | .................... | H04L 5/0007 |
| 2019/0313418 A1* | 10/2019 | Wang | .................... | H04W 72/04 |
| 2019/0364449 A1* | 11/2019 | Yang | .................... | H04W 72/04 |
| 2020/0044764 A1* | 2/2020 | Xu | ........................ | H04L 5/0048 |
| 2020/0389805 A1* | 12/2020 | Kim | ..................... | H04W 24/10 |
| 2022/0006501 A1* | 1/2022 | Kim | ..................... | H04W 24/10 |
| 2022/0086843 A1* | 3/2022 | Ying | ................... | H04B 17/318 |
| 2022/0095240 A1* | 3/2022 | Ying | ................... | H04B 17/336 |

FOREIGN PATENT DOCUMENTS

| | | | |
|---|---|---|---|
| CN | 110383722 A | 10/2019 | |
| CN | 110637494 A | 12/2019 | |
| EP | 3567759 A1 | 11/2019 | |
| WO | WO-2018127001 A1 | 7/2018 | |
| WO | 2019215288 A1 | 11/2019 | |
| WO | 2019220005 A1 | 11/2019 | |

OTHER PUBLICATIONS

International Search Report and Written Opinion—PCT/CN2020/071783—ISA/EPO—Oct. 10, 2020.

\* cited by examiner

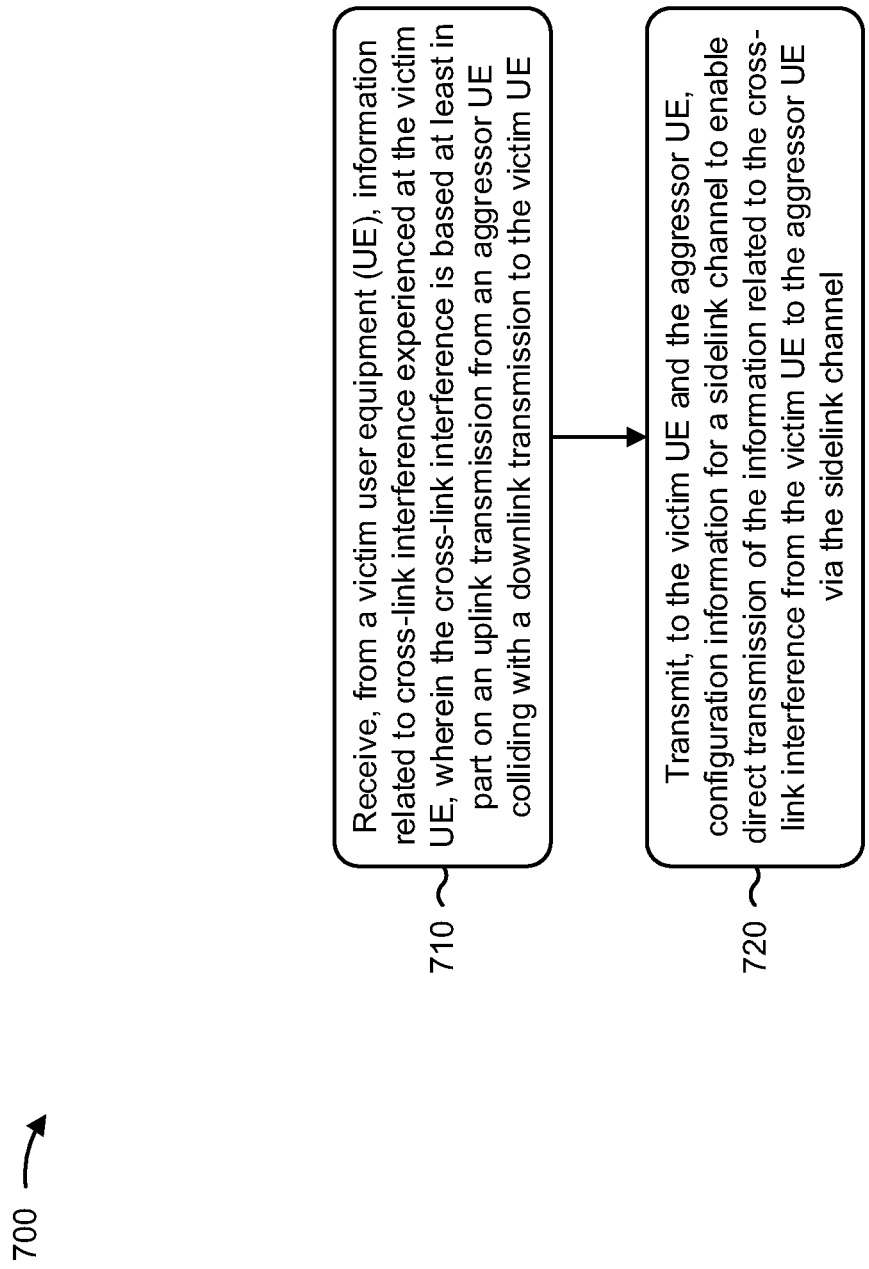

SIDELINK TRANSMISSION OF CROSS-LINK INTERFERENCE INFORMATION BY A VICTIM USER EQUIPMENT

CROSS-REFERENCE TO RELATED APPLICATION

This application is a 371 national stage of Patent Cooperation Treaty (PCT) Application No. PCT/CN2020/071783 filed on Jan. 13, 2020, entitled "SIDELINK TRANSMISSION OF CROSS-LINK INTERFERENCE INFORMATION BY A VICTIM USER EQUIPMENT," which is hereby expressly incorporated by reference herein.

FIELD OF THE DISCLOSURE

Aspects of the present disclosure generally relate to wireless communication and to techniques and apparatuses for sidelink transmission of cross-link interference information by a victim user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a victim user equipment (UE), may include: measuring a cross-link interference strength from an aggressor UE based at least in part on an uplink transmission from the aggressor UE colliding with a downlink transmission to the victim UE; and transmitting cross-link interference information to the aggressor UE on a sidelink channel, wherein the cross-link interference information transmitted to the aggressor UE indicates at least the cross-link interference strength.

In some aspects, a victim UE for wireless communication may include a memory and one or more processors operatively coupled to the memory. The memory and the one or more processors may be configured to: measure a cross-link interference strength from an aggressor UE based at least in part on an uplink transmission from the aggressor UE colliding with a downlink transmission to the victim UE; and transmit cross-link interference information to the aggressor UE on a sidelink channel, wherein the cross-link interference information transmitted to the aggressor UE indicates at least the cross-link interference strength.

In some aspects, a non-transitory computer-readable medium may store one or more instructions for wireless communication. The one or more instructions, when executed by one or more processors of a victim UE, may cause the one or more processors to: measure a cross-link interference strength from an aggressor UE based at least in part on an uplink transmission from the aggressor UE colliding with a downlink transmission to the victim UE; and transmit cross-link interference information to the aggressor UE on a sidelink channel, wherein the cross-link interference information transmitted to the aggressor UE indicates at least the cross-link interference strength.

In some aspects, an apparatus for wireless communication may include means for measuring a cross-link interference strength from an aggressor UE based at least in part on an uplink transmission from the aggressor UE colliding with a downlink transmission to the apparatus; and means for transmitting cross-link interference information to the aggressor UE on a sidelink channel, wherein the cross-link interference information transmitted to the aggressor UE indicates at least the cross-link interference strength.

In some aspects, a method of wireless communication, performed by an aggressor UE, may include: receiving cross-link interference information from a victim UE on a sidelink channel, wherein the cross-link interference information indicates at least a cross-link interference strength that is based at least in part on an uplink transmission from the aggressor UE colliding with a downlink transmission to the victim UE; and adjusting one or more uplink transmissions to mitigate performance loss at the victim UE based at least in part on the cross-link interference information.

In some aspects, an aggressor UE for wireless communication may include a memory and one or more processors operatively coupled to the memory. The memory and the one or more processors may be configured to: receive cross-link interference information from a victim UE on a sidelink channel, wherein the cross-link interference information indicates at least a cross-link interference strength that is based at least in part on an uplink transmission from the aggressor UE colliding with a downlink transmission to the victim UE; and adjust one or more uplink transmissions to mitigate performance loss at the victim UE based at least in part on the cross-link interference information.

In some aspects, a non-transitory computer-readable medium may store one or more instructions for wireless communication. The one or more instructions, when executed by one or more processors of an aggressor UE, may cause the one or more processors to: receive cross-link interference information from a victim UE on a sidelink channel, wherein the cross-link interference information indicates at least a cross-link interference strength that is based at least in part on an uplink transmission from the aggressor UE colliding with a downlink transmission to the victim UE; and adjust one or more uplink transmissions to mitigate performance loss at the victim UE based at least in part on the cross-link interference information.

In some aspects, an apparatus for wireless communication may include: means for receiving cross-link interference information from a victim UE on a sidelink channel, wherein the cross-link interference information indicates at least a cross-link interference strength that is based at least in part on an uplink transmission from the apparatus colliding with a downlink transmission to the victim UE; and means for adjusting one or more uplink transmissions to mitigate performance loss at the victim UE based at least in part on the cross-link interference information.

In some aspects, a method of wireless communication, performed by a base station, may include: receiving, from a victim UE, information related to cross-link interference experienced at the victim UE, wherein the cross-link interference is based at least in part on an uplink transmission from an aggressor UE colliding with a downlink transmission to the victim UE; and transmitting, to the victim UE and the aggressor UE, configuration information for a sidelink channel to enable direct transmission of the information related to the cross-link interference from the victim UE to the aggressor UE via the sidelink channel.

In some aspects, a base station for wireless communication may include a memory and one or more processors operatively coupled to the memory. The memory and the one or more processors may be configured to: receive, from a victim UE, information related to cross-link interference experienced at the victim UE, wherein the cross-link interference is based at least in part on an uplink transmission from an aggressor UE colliding with a downlink transmission to the victim UE; and transmit, to the victim UE and the aggressor UE, configuration information for a sidelink channel to enable direct transmission of the information related to the cross-link interference from the victim UE to the aggressor UE via the sidelink channel.

In some aspects, a non-transitory computer-readable medium may store one or more instructions for wireless communication. The one or more instructions, when executed by one or more processors of a base station, may cause the one or more processors to: receive, from a victim UE, information related to cross-link interference experienced at the victim UE, wherein the cross-link interference is based at least in part on an uplink transmission from an aggressor UE colliding with a downlink transmission to the victim UE; and transmit, to the victim UE and the aggressor UE, configuration information for a sidelink channel to enable direct transmission of the information related to the cross-link interference from the victim UE to the aggressor UE via the sidelink channel.

In some aspects, an apparatus for wireless communication may include means for receiving, from a victim UE, information related to cross-link interference experienced at the victim UE, wherein the cross-link interference is based at least in part on an uplink transmission from an aggressor UE colliding with a downlink transmission to the victim UE; and means for transmitting, to the victim UE and the aggressor UE, configuration information for a sidelink channel to enable direct transmission of the information related to the cross-link interference from the victim UE to the aggressor UE via the sidelink channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
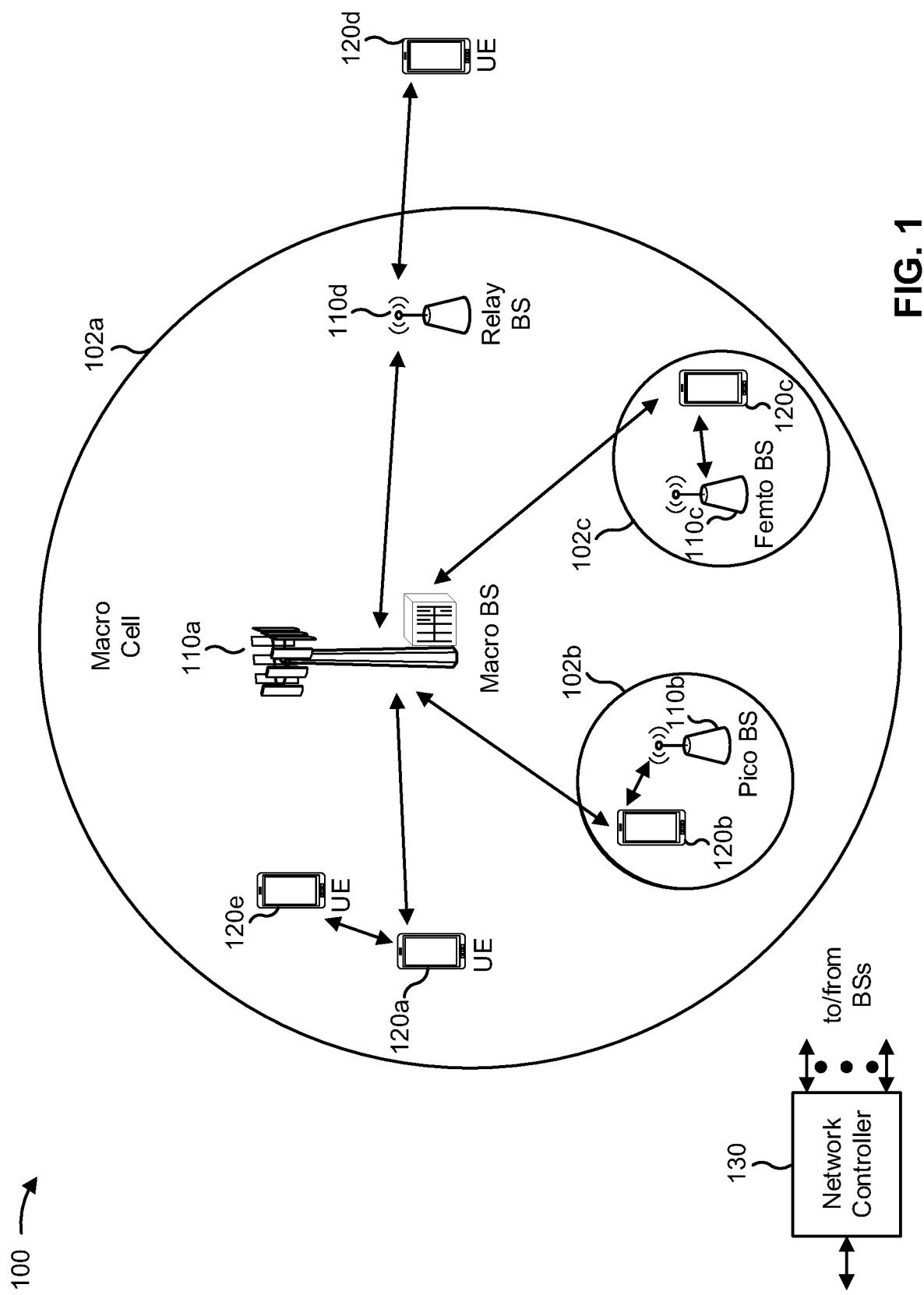
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs 120 may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e, but may alternatively include, for example, an aggressor UE that causes UE-to-UE cross-link interference to be experienced at a victim UE as described elsewhere herein) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110. In some aspects, the one or more sidelink channels may include a physical sidelink control channel (PSCCH) that two or more UEs 120 may use to communicate control information, a physical sidelink feedback channel (PSFCH) that two or more UEs 120 may use to communicate feedback information (e.g., hybrid automatic repeat request (HARQ) feedback to provide an acknowledgement (ACK) or a negative acknowledgement (NACK) for a scheduled sidelink transmission), a physical sidelink shared channel (PSSCH) that two or more UEs 120 may use to transmit data, and/or the like. Furthermore, in some aspects, communication over the one or more sidelink channels may occur over a carrier that is shared with a Uu interface between a UE 120 and a base station 110, dedicated to sidelink communications, and/or the like. In some aspects, the carrier to be used for the sidelink communications may be configured by a base station 110 or by the UE 120 that performs scheduling operations, resource selection operations, and/or the like. In some aspects, communication over the one or more sidelink channels may include unsupervised transmissions and/or unicast transmissions that are supervised by a base station 110.

As indicated above, FIG. 1 is provided as an example. Other examples may differ from what is described with regard to FIG. 1.

Figure 2:
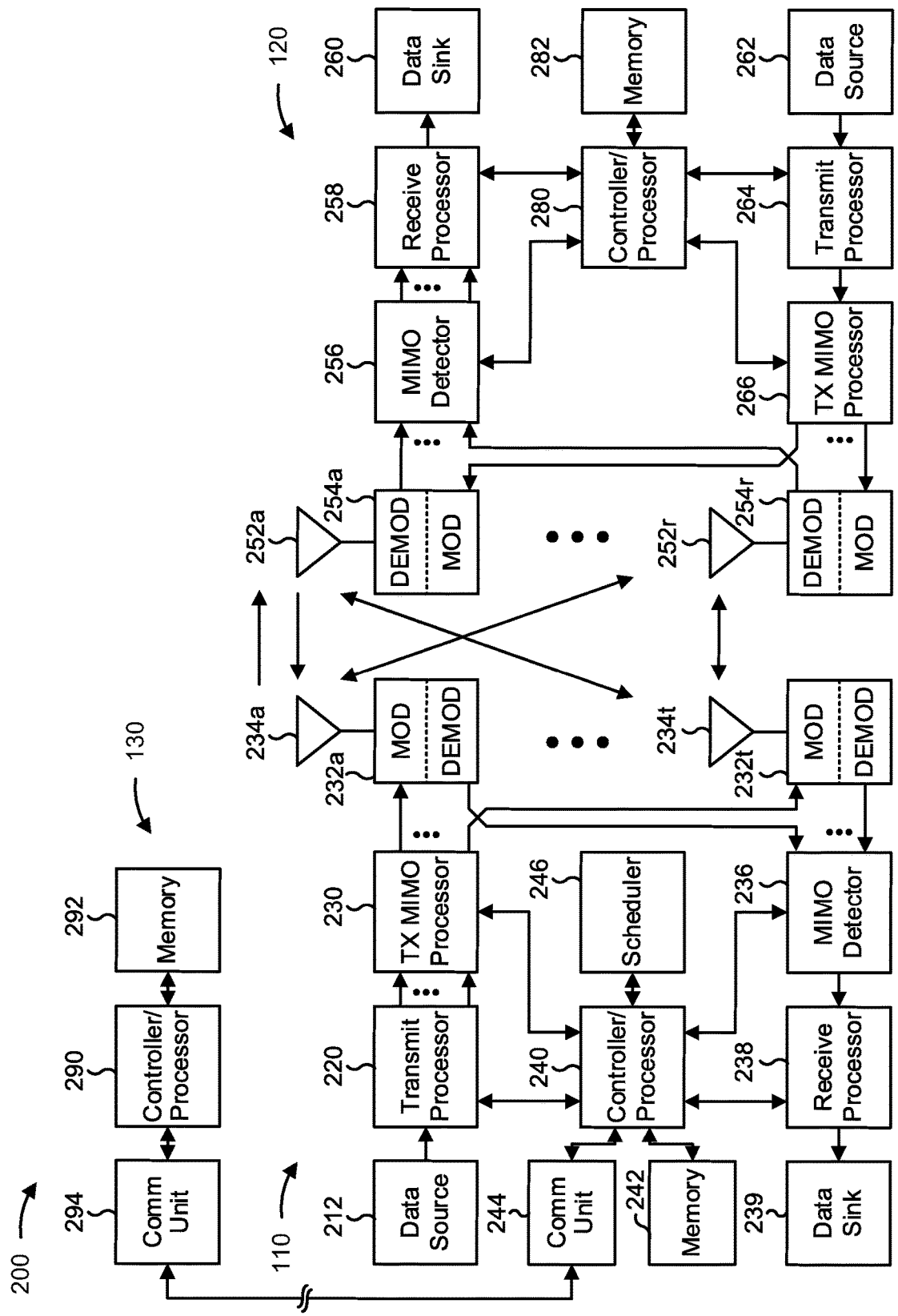
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink transmission of cross-link interference information, as described in more detail elsewhere herein. UE 120 illustrated in FIG. 2 can be an aggressor UE 120agg that causes UE-to-UE cross-link interference to be experienced at a victim UE 120vic or a victim UE 120vic that experiences UE-to-UE cross-link interference caused by an aggressor UE 120agg, as described elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, and/or other processes as described herein, such as aspects described below in connection with FIG. 4. Memories 242 and 282 may store data and program codes for base station 110 and UE 120, respectively. Accordingly, memory 282 of UE 120 can comprise a non-transitory computer-readable medium storing one or more instructions for wireless communication, where the one or more instructions comprise one or more instructions that, when executed by one or more processors (e.g., processor 258 and/or controller/processor 280) of UE 120, cause and/or instruct the one or more processors to perform one or more methods described in greater detail below with reference to FIGS. 4-7. In some aspects, a scheduler 246 may schedule UEs for data transmission on the downlink and/or uplink.

In some aspects, UE 120 may include means for measuring a cross-link interference strength from an aggressor UE 120 based at least in part on an uplink transmission from the aggressor UE 120 colliding with a downlink transmission to UE 120 (e.g., using antenna 252, DEMOD 254, MIMO detector 256, receive processor 258, controller/processor 280, memory 282, and/or the like), means for transmitting, to the aggressor UE 120 on a sidelink channel, cross-link interference information that indicates at least the cross-link interference strength (e.g., using controller/processor 280, transmit processor 264, TX MIMO processor 266, MOD 254, antenna 252, and/or the like), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

Additionally, or alternatively, in some aspects, UE 120 may include means for receiving, from a victim UE 120 on a sidelink channel, cross-link interference information that indicates at least a cross-link interference strength that is based at least in part on an uplink transmission from the apparatus colliding with a downlink transmission to the victim UE (e.g., using antenna 252, DEMOD 254, MIMO detector 256, receive processor 258, controller/processor 280, memory 282, and/or the like), means for adjusting one or more uplink transmissions to mitigate performance loss at the victim UE based at least in part on the cross-link interference information (e.g., using controller/processor 280, transmit processor 264, TX MIMO processor 266, MOD 254, antenna 252, and/or the like), and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a victim UE 120, information related to cross-link interference experienced at the victim UE 120 based at least in part on an uplink transmission from an aggressor UE 120 colliding with a downlink transmission to the victim UE 120 (e.g., using antenna 234, DEMOD 232, MIMO detector 236, receive processor 238, controller/processor 240, and/or the like), means for transmitting, to the victim UE 120 and the aggressor UE 120, configuration information for a sidelink channel to enable direct transmission of the information related to the cross-link interference from the victim UE 120 to the aggressor UE 120 via the sidelink channel (e.g., using controller/processor 240, transmit processor 220, TX MIMO processor 230, MOD 232, antenna 234, and/or the like), and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
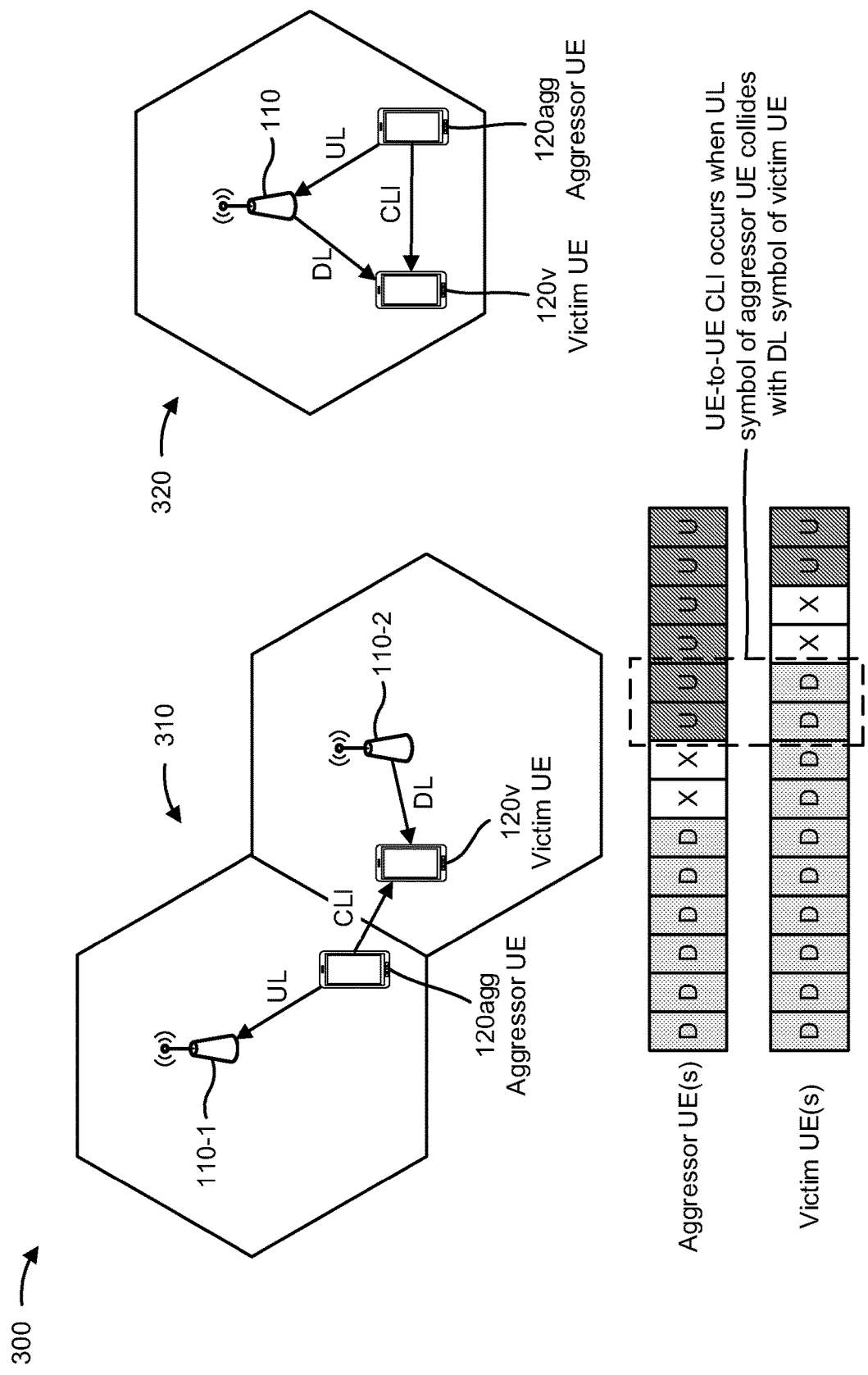
FIG. 3 is a diagram illustrating one or more examples of UE-to-UE cross-link interference, in accordance with various aspects of the present disclosure.

FIG. 3 is a diagram illustrating one or more examples 300 of UE-to-UE cross-link interference, in accordance with various aspects of the present disclosure.

As shown in FIG. 3, and by reference number 310, UE-to-UE cross-link interference may occur in a first scenario in which a first base station 110-1 may provide a first cell to serve a first UE 120agg and a second base station 110-2 may provide a second cell, which neighbors the first cell, to serve a second UE 120vic. In some cases, a dynamic time division duplexing (TDD) configuration may result in UE-to-UE cross-link interference (CLI). For example, when the first UE 120agg transmits an uplink (UL) transmission on an uplink symbol in the first cell, the uplink transmission may collide with a downlink (DL) transmission to the second UE 120vic on a downlink symbol in the second cell. In this case, the first UE 120agg may be referred to herein as an aggressor UE 120agg that causes the UE-to-UE cross-link interference, and the second UE 120vic may be referred to herein as a victim UE 120vic that experiences the UE-to-UE cross-link interference. In general, UE-to-UE cross-link interference may be more likely to occur at cell edges between neighboring cells and may result in a degraded signal-to-interference-plus-noise ratio (SINR) for the victim UE 120vic. For example, neighboring cells may be associated with different TDD configurations or time division multiplexing (TDM) patterns, which may result in UE-to-UE cross-link interference in cases where a first cell is associated with a first TDD configuration or TDM pattern that includes one or more uplink (interfering symbols) that coincide or otherwise collide with one or more downlink (interfered symbols) in nearby neighboring cells.

Additionally, or alternatively, as shown by reference number 320, UE-to-UE cross-link interference may occur in a second scenario in which a single base station 110 provides a cell to provide coverage to both an aggressor UE 120*agg* and a victim UE 120*vic*. For example, in some aspects, the base station 110 may provide full-duplex capabilities that enables concurrent uplink and downlink transmissions. In this case, the aggressor UE 120*agg* and/or the victim UE 120*vic* may be provided with a TDD configuration and/or a TDM pattern that enables concurrent uplink and downlink transmissions. For example, in some aspects, the TDD configuration and/or TDD pattern that enables the concurrent uplink and downlink transmissions may be provided for all UEs in the cell via cell-specific signaling (e.g., radio resource control (RRC) signaling), or the TDD configuration and/or TDD pattern that enables the concurrent uplink and downlink transmissions may be provided for individual UEs that have full-duplex capabilities via UE-specific signaling. Accordingly, UE-to-UE cross-link interference may occur in an intra-cell scenario in cases where the aggressor UE 120*agg* transmits on an uplink in a symbol in which the victim UE 120*vic* is to receive a downlink transmission, which may cause cross-link interference at the victim UE 120*vic*.

In some circumstances, the aggressor UE 120*agg* may be configured to adjust uplink transmissions that cause UE-to-UE cross-link interference for the victim UE 120*vic* in order to mitigate performance loss (e.g., degraded SINR) experienced at the victim UE 120*vic*. For example, the aggressor UE 120*agg* may be configured to perform a transmit power control procedure that enables the aggressor UE 120*agg* to adjust (e.g., reduce) an uplink transmit power based at least in part on a physical uplink shared channel (PUSCH) transmit power, a maximum configured output power, a target received power at base station 110, and/or other factors. In general, the aggressor UE 120*agg* may depend on having the applicable cross-link interference measurements in order for the aggressor UE 120 to take appropriate action to mitigate the UE-to-UE cross-link interference experienced at the victim UE 120*vic*. However, when the victim UE 120*vic* is experiencing UE-to-UE cross-link interference from the aggressor UE 120*agg*, there may not be any UE-to-UE cross-link interference that is experienced or otherwise measurable at the aggressor UE 120*agg*.

Accordingly, in some cases, the victim UE 120*vic* may measure the cross-link interference experienced at the victim UE 120*vic* and report the measured cross-link interference to a base station that then decides whether to provide the cross-link interference information to the aggressor UE 120*agg*. This may result in inefficiency in notifying the aggressor UE 120*agg* about the UE-to-UE cross-link interference experienced at the victim UE 120*vic* because the cross-link interference information has to travel multiple hops before reaching the aggressor UE 120*agg*. Furthermore, in cases where the base station decides to not inform the aggressor 120*agg* about the cross-link interference, the victim UE 120*vic* may continue to suffer degraded performance due to uplink transmissions by the aggressor 120*agg* colliding with downlink transmissions to the victim 120*vic*. Thus, some aspects described herein enable the victim UE 120*vic* to provide information related to cross-link interference to the aggressor UE 120*agg* directly via one or more sidelink channels such that the aggressor UE 120*agg* may adjust uplink transmissions that are causing the cross-link interference to mitigate performance loss at the victim UE 120*vic*. In this way, a likelihood of the aggressor UE 120*agg* causing cross-link interference at the victim UE 120*vic* is reduced, thereby improving network communication, and transmitting the cross-link interference information directly via the sidelink channel(s) may improve network capacity and efficiency.

As indicated above, FIG. 3 is provided as an example. Other examples may differ from what is described with respect to FIG. 3.

Figure 4:
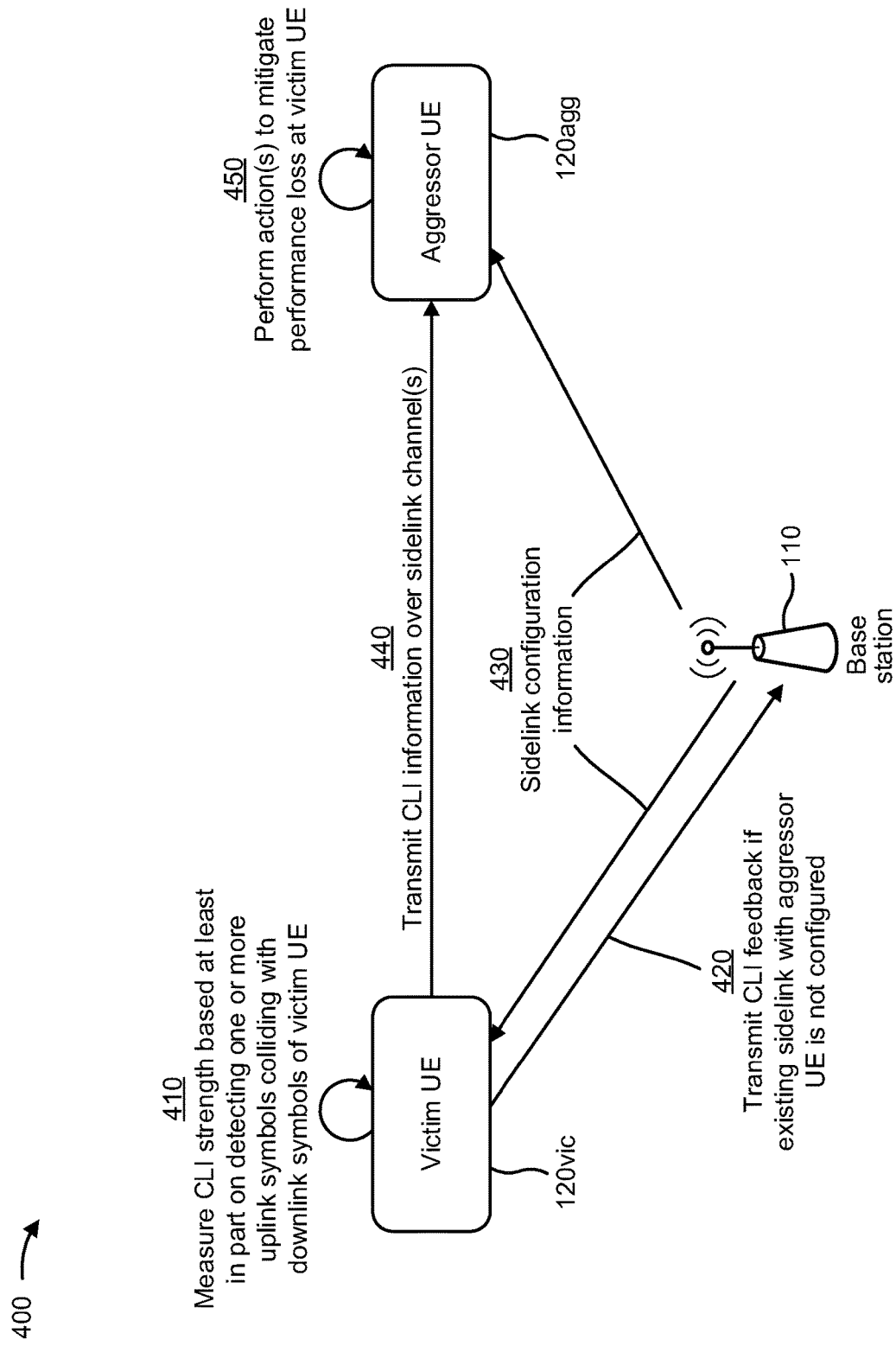
FIG. 4 is a diagram illustrating one or more examples of sidelink transmission of cross-link interference information by a victim UE, in accordance with various aspects of the present disclosure.

FIG. 4 is a diagram illustrating one or more examples 400 of sidelink transmission of cross-link interference information by a victim UE, in accordance with various aspects of the present disclosure. As shown in FIG. 4, example(s) 400 include a victim UE 120*vic* that transmits cross-link interference information directly to an aggressor UE 120*agg* via one or more sidelink channels based at least in part on the aggressor UE 120*agg* causing UE-to-UE cross-link interference at the victim UE 120*vic*. Furthermore, in some aspects, example(s) 400 may include a base station 110 that may assist with establishing a sidelink configuration between the victim UE 120*vic* and the aggressor UE 120*agg* to enable the sidelink transmission of the cross-link interference information from the victim UE 120*vic* to the aggressor UE 120*agg*.

As shown in FIG. 4, and by reference number 410, the victim UE 120*vic* may measure a cross-link interference strength experienced at the victim UE 120*vic* based at least in part on detecting one or more uplink symbols transmitted by the aggressor UE 120*agg* that collide with one or more downlink symbols of the victim UE 120*vic*. For example, in some aspects, the cross-link interference strength may be measured based at least in part on a received signal strength indicator (RSSI), which may be measured as a linear average of a total received power observed by the victim UE 120*vic* in certain OFDM symbols that correspond to measurement time resources in a frequency bandwidth to be measured. In some aspects, the resources to be used for the RSSI measurement may be configured according to a symbol-level indication (e.g., a starting OFDM symbol and an ending OFDM symbol) and a physical resource block (PRB) indication (e.g., a starting PRB and an ending PRB) within a downlink active bandwidth part. Additionally, or alternatively, the cross-link interference strength may be measured based at least in part on a reference signal received power (RSRP) associated with a sounding reference signal (SRS). For example, in some aspects, the SRS may correspond to a reference signal that the aggressor UE 120*agg* transmits to a base station (e.g., base station 110) in an uplink direction to enable the base station to estimate uplink quality, evaluate uplink transmission timing, and/or the like. Accordingly, in some aspects, the victim UE 120*vic* may measure the RSRP based at least in part on a linear average of power contributions of the SRS transmitted by the aggressor UE 120*agg* over a set of configured resource elements or measurement occasions that include time and frequency resources in which the SRS is transmitted by the aggressor UE 120*agg*. Additionally, or alternatively, in some aspects, the cross-link interference strength may be measured based at least in part on one or more physical layer (or Layer-1 (L1)) parameters that are measured in one or more symbols in which the uplink transmission(s) from the aggressor UE 120*agg* collides with the downlink transmission(s) to the victim UE 120*vic* (e.g., an L1-RSRP, reference signal received quality (RSRQ), SINR, a SNR, and/or the like).

As further shown in FIG. 4, and by reference number 420, the victim UE 120*vic* may transmit, and the base station 110 may receive, feedback related to the cross-link interference experienced at the victim UE 120*vic* in cases where an existing sidelink with the aggressor UE 120*agg* is not configured. For example, in some aspects, the cross-link interference feedback may indicate the cross-link interference strength measured by the victim UE 120*vic*, a frequency bandwidth in which the cross-link interference strength was measured, one or more downlink symbols in which the victim UE 120*vic* experienced the cross-link interference, and/or the like.

As further shown in FIG. 4, and by reference number 430, the base station 110 may provide sidelink configuration information to the victim UE 120*vic* and the aggressor UE 120*agg* based at least in part on the cross-link interference feedback provided by the victim UE 120*vic*. For example, in some aspects, the sidelink configuration information may indicate a carrier frequency to be used for sidelink communications between the victim UE 120*vic* and the aggressor UE 120*agg*. For example, the carrier frequency may be a shared carrier that is used for the sidelink communications between the victim UE 120*vic* and the aggressor UE 120*agg* and also used for communication over a Uu interface between the base station 110 and the victim UE 120*vic* and/or the aggressor UE 120*agg*. Furthermore, in some aspects, the sidelink configuration information may indicate whether sidelink communications between the victim UE 120*vic* and the aggressor UE 120*agg* are to include unsupervised unicast transmissions or unicast transmissions that are supervised by the base station 110.

As further shown in FIG. 4, and by reference number 440, the victim UE 120*vic* may transmit, and the aggressor UE 120*agg* may receive, cross-link interference information over one or more sidelink channels. For example, in some aspects, the one or more sidelink channels may be associated with an existing sidelink connection between the victim UE 120*vic* and the aggressor UE 120*agg*, or the sidelink connection may be established according to sidelink configuration information provided by the base station 110 in cases where there is not an existing sidelink connection between the victim UE 120*vic* and the aggressor UE 120*agg*.

In general, the cross-link interference information transmitted to the aggressor UE 120*agg* may include at least the cross-link interference strength measured by the victim UE 120*vic*. For example, as described above, the cross-link interference strength may be based at least in part on an RSSI measured as a linear average of a total received power observed by the victim UE 120*vic* in certain OFDM symbols, an RSRP measured as a linear average of power contributions of an SRS transmitted by the aggressor UE 120*agg* over a set of configured resource elements or measurement occasions, one or more physical layer (or L1) parameters that are measured in one or more symbols in which the uplink transmission(s) from the aggressor UE 120*agg* collides with the downlink transmission(s) to the victim UE 120*vic*, and/or the like. Furthermore, in some aspects, the cross-link interference information transmitted to the aggressor UE 120*agg* may further include a frequency bandwidth in which the cross-link interference is measured by the victim UE 120*vic* and/or information related to one or more downlink symbols in which the victim UE 120*vic* experienced the cross-link interference from the aggressor UE 120*agg*. In the latter case, the downlink symbol(s) in which the victim UE 120*vic* experienced the cross-link interference from the aggressor UE 120*agg* may be explicitly indicated in the cross-link interference information, or the interfered downlink symbol(s) may be implicitly indicated. For example, the victim UE 120*vic* may transmit, to the aggressor UE 120*agg*, information related to a downlink symbol pattern that is configured for the victim UE 120*vic* or a TDM configuration (e.g., an uplink/downlink configuration) that includes uplink and downlink symbols for each slot. In this case, the aggressor UE 120*agg* may determine which downlink symbols of the victim UE 120*vic* are impacted by the uplink symbols of the aggressor UE 120*agg* that are causing the cross-link interference at the victim UE 120*vic*.

In some aspects, when transmitting the cross-link interference information to the aggressor UE 120*agg*, the victim UE 120*vic* may transmit, to the aggressor UE 120*agg*, information to schedule transmission of the cross-link interference via a physical sidelink control channel (PSCCH). Furthermore, in some aspects, the cross-link interference information may be transmitted via the PSCCH, or the cross-link interference information may be transmitted via a physical sidelink shared channel (PSSCH) that is scheduled by the PSCCH. For example, the cross-link interference information may be transmitted via the PSCCH in cases where the cross-link interference information has a size that fails to satisfy a threshold (e.g., where the cross-link interference information includes only the cross-link interference strength measured by the victim UE 120*vic*). Alternatively, the cross-link interference information may be transmitted via the PSSCH if the cross-link interference information has a size that satisfies the threshold (e.g., in cases where the cross-link interference information includes additional information such as the frequency bandwidth in which the cross-link interference was measured, the TDM pattern of the victim UE 120*vic*, and/or the like).

In some aspects, the victim UE 120*vic* may further determine a transmit power level to be used when transmitting the cross-link interference information to the aggressor UE 120*agg*. For example, in some cases, an uplink beam that the victim UE 120*vic* uses to communicate with a base station (e.g., base station 110) may be associated with a transmit power that differs from a transmit power associated with a sidelink beam used for direct communication with the aggressor UE 120*agg* via the sidelink channel(s). In such cases, the victim UE 120*vic* may determine the appropriate power level to use when transmitting the cross-link interference information to the aggressor UE 120*agg*.

For example, in some aspects, the victim UE 120*vic* may use a transmit power associated with the sidelink beam to explicitly indicate at least a portion of the cross-link interference information, or the victim UE 120*vic* may use a transmit power associated with the uplink beam, in which case at least a portion of the cross-link interference information may be implicitly indicated. For example, rather than explicitly indicating the cross-link interference strength in the cross-link interference information transmitted to the aggressor UE 120*agg*, the aggressor UE 120*agg* may measure interference from the victim UE 120*vic* based at least in part on a channel reciprocity of the sidelink channel(s) between the victim UE 120*vic* and the aggressor UE 120*agg*. In particular, due to the principle of channel reciprocity in a TDD configuration, cross-link interference from the aggressor UE 120*agg* to the victim UE 120*vic* may be the same as cross-link interference from the victim UE 120*vic* to the aggressor UE 120*agg*. Accordingly, when the victim UE 120*vic* uses the transmit power associated with the uplink beam to transmit the cross-link interference information to the aggressor UE 120*agg*, the aggressor UE 120*agg* may measure the cross-link interference strength that would occur when the victim UE 120*vic* performs an uplink transmission concurrently with downlink reception at the aggressor UE 120*agg*.

In some aspects, the victim UE 120*vic* may determine whether to transmit the cross-link interference information using the transmit power associated with the sidelink beam or the transmit power associated with the uplink beam according to one or more criteria, which may be based at least in part on the cross-link interference strength and/or one or more predefined rules. In some aspects, the criteria that the victim UE 120*vic* uses to select the appropriate transmit power for the cross-link interference information transmission may be determined from cell-specific RRC signaling, from UE-specific signaling associated with the victim UE 120*vic*, and/or the like. In some aspects, in cases where the transmit power to be used is determined from the cross-link interference strength, the victim UE 120*vic* may use the transmit power associated with the uplink beam based at least in part on the cross-link interference strength satisfying a threshold. For example, in such cases, the aggressor UE 120*agg* may be able to measure the cross-link interference experienced at the victim UE 120*vic* due to channel reciprocity, as described above. Alternatively, in cases where the cross-link interference strength fails to satisfy the threshold such that the aggressor UE 120*agg* may be unable to measure the cross-link interference experienced at the victim UE 120*vic*, the victim UE 120*vic* may use the transmit power associated with the sidelink beam to explicitly indicate the cross-link interference information.

In another example, the victim UE 120*vic* may determine the transmit power to be used based at least in part on a configuration of the sidelink between the victim UE 120*vic* and the aggressor UE 120*agg*. For example, the victim UE 120*vic* may transmit the cross-link interference information using the transmit power of the uplink beam if the sidelink communication between the victim UE 120*vic* and the aggressor UE 120*agg* is over a carrier that is shared with a Uu interface with the base station 110, or the victim UE 120*vic* may alternatively transmit the cross-link interference information using the transmit power of the sidelink beam if the sidelink communication between the victim UE 120*vic* and the aggressor UE 120*agg* is over a dedicated sidelink carrier.

In another example, the victim UE 120*vic* may initially transmit the cross-link interference information using the transmit power of the uplink beam to implicitly indicate the cross-link interference information, and may subsequently retransmit the cross-link interference information using the transmit power of the sidelink beam to explicitly indicate the cross-link interference information based at least in part on a lack of feedback from the aggressor UE 120*agg* or a lack of interference elimination following the initial cross-link interference information transmission. For example, in cases where the victim UE 120*vic* does not receive feedback from the aggressor UE 120*agg* or the cross-link interference continues to occur following the initial cross-link interference information transmission, the victim UE 120*vic* may determine that the aggressor UE 120*agg* did not receive the initial cross-link interference information transmission or was otherwise unable to accurately determine parameters to mitigate the cross-link interference from the initial transmission in which the cross-link interference information was implicitly indicated by using the transmit power of the uplink beam. Accordingly, the victim UE 120*vic* may use the transmit power of the sidelink beam to explicitly indicate the cross-link interference information in the retransmission.

As further shown in FIG. 4, and by reference number 450, the aggressor UE 120*agg* may perform one or more actions to mitigate performance loss at the victim UE 120*vic* based at least in part on the cross-link interference information transmitted over the sidelink channel(s) by the victim UE 120*vic*. For example, in some aspects, the one or more actions performed by the aggressor UE 120*agg* may generally include adjusting one or more uplink transmissions that may be causing the cross-link interference experienced at the victim UE 120*vic*. For example, in some aspects, the aggressor UE 120*agg* may reduce an uplink transmit power in all uplink symbols within a slot, reduce an uplink transmit power only in one or more uplink symbols of the aggressor UE 120*agg* that coincide with one or more downlink symbols of the victim UE 120*vic*, reduce an uplink power in all uplink symbols that are associated with the same uplink transmission, and/or the like (e.g., to maintain phase continuity for all symbols associated with a particular physical uplink shared channel transmission), and/or the like. Additionally, or alternatively, in cases where the aggressor UE 120*agg* receives cross-link interference information from multiple victim UEs 120*vic*, the action(s) performed by the aggressor UE 120*agg* to mitigate performance loss at the victim UEs 120*vic* may adjust uplink transmissions according to a strongest cross-link interference among the cross-link interference measurements provided by the victim UEs 120*vic*, an average cross-link interference experienced by the victim UEs 120*vic*, or a cross-link interference strength from one of the victim UEs 120*vic* that has a highest priority.

As indicated above, FIG. 4 is provided as an example. Other examples may differ from what is described with respect to FIG. 4.

Figure 5:
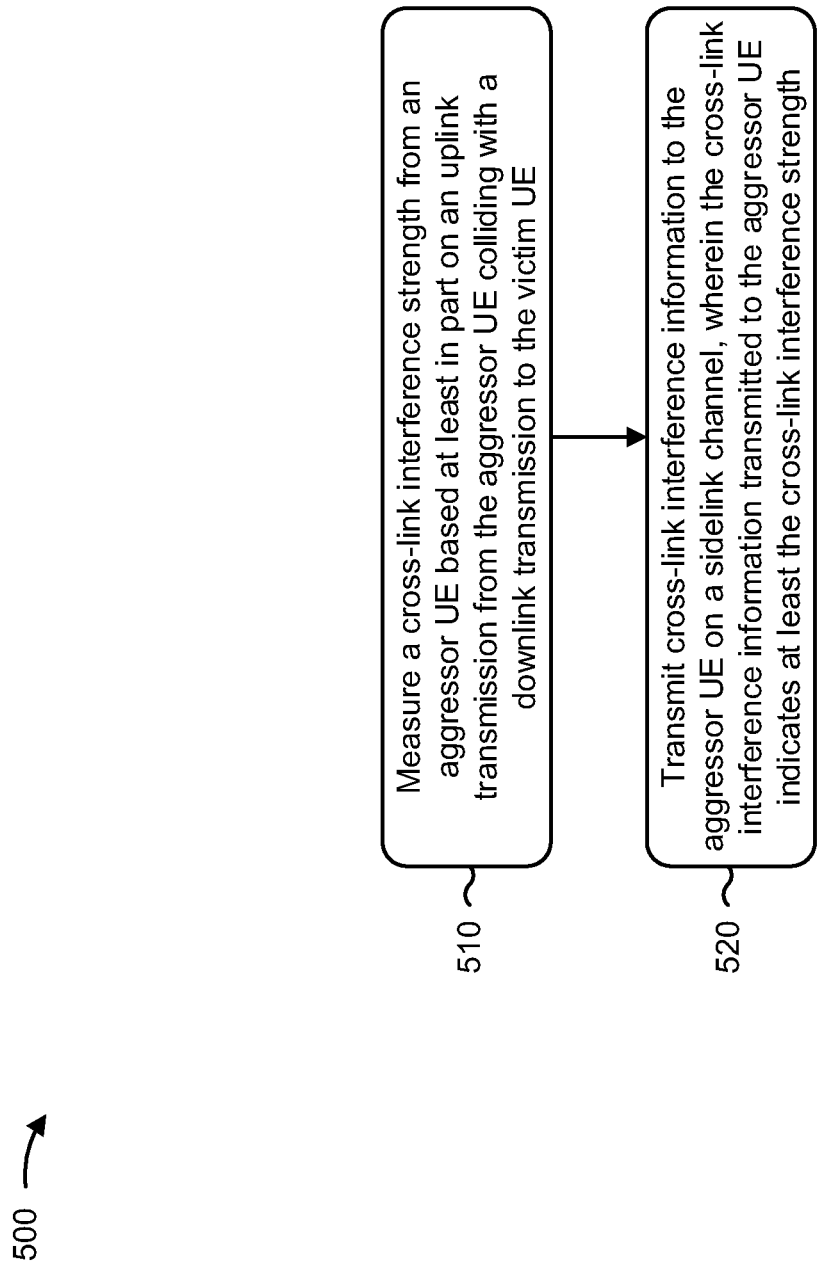
FIG. 5 is a diagram illustrating an example process performed, for example, by a victim UE, in accordance with various aspects of the present disclosure.

FIG. 5 is a diagram illustrating an example process 500 performed, for example, by a victim UE, in accordance with various aspects of the present disclosure. Example process 500 is an example where the victim UE (e.g., UE 120, victim UE 120*vic*, and/or the like) performs operations associated with sidelink transmission of cross-link interference information.

As shown in FIG. 5, in some aspects, process 500 may include measuring a cross-link interference strength from an aggressor UE based at least in part on an uplink transmission from the aggressor UE colliding with a downlink transmission to the victim UE (block 510). For example, the victim UE may measure (e.g., using antenna 252, DEMOD 254, MIMO detector 256, receive processor 258, controller/processor 280, memory 282, and/or the like) a cross-link interference strength from an aggressor UE based at least in part on an uplink transmission from the aggressor UE colliding with a downlink transmission to the victim UE, as described above, for example, with reference to FIG. 3 and/or FIG. 4.

As further shown in FIG. 5, in some aspects, process 500 may include transmitting cross-link interference information to the aggressor UE on a sidelink channel, wherein the cross-link interference information transmitted to the aggressor UE indicates at least the cross-link interference strength (block 520). For example, the victim UE may transmit (e.g., using controller/processor 280, transmit processor 264, TX MIMO processor 266, MOD 254, antenna 252, and/or the like) cross-link interference information to the aggressor UE on a sidelink channel, as described above, for example, with reference to FIG. 3 and/or FIG. 4. In some aspects, the cross-link interference information transmitted to the aggressor UE indicates at least the cross-link interference strength.

Process 500 may include additional aspects, such as any single aspect or any combination of aspects described below and/or in connection with one or more other processes described elsewhere herein.

In a first aspect, process 500 includes transmitting, to the aggressor UE, information scheduling transmission of the cross-link interference information via a PSCCH.

In a second aspect, alone or in combination with the first aspect, process 500 includes transmitting, to a base station, information related to the cross-link interference strength from the aggressor UE, and process 500 further includes receiving, from the base station, configuration information for the sidelink channel, where the cross-link interference information is transmitted to the aggressor UE based at least in part on the configuration information for the sidelink channel.

In a third aspect, alone or in combination with one or more of the first and second aspects, the cross-link interference strength is based at least in part on an RSSI, an RSRP, and/or a physical layer parameter measured in one or more symbols in which the uplink transmission from the aggressor UE collides with the downlink transmission to the victim UE.

In a fourth aspect, alone or in combination with one or more of the first through third aspects, the cross-link interference information transmitted to the aggressor UE further indicates a frequency bandwidth in which the cross-link interference strength is measured.

In a fifth aspect, alone or in combination with one or more of the first through fourth aspects, the cross-link interference information transmitted to the aggressor UE further indicates one or more symbols in which the uplink transmission from the aggressor UE collides with the downlink transmission to the victim UE.

In a sixth aspect, alone or in combination with one or more of the first through fifth aspects, the cross-link interference information transmitted to the aggressor UE further indicates a TDM pattern that includes one or more downlink symbols for the victim UE.

In a seventh aspect, alone or in combination with one or more of the first through sixth aspects, the cross-link interference information is transmitted using a transmit power associated with an uplink beam to implicitly indicate at least a portion of the cross-link interference information.

In an eighth aspect, alone or in combination with one or more of the first through seventh aspects, the cross-link interference information is transmitted using the transmit power associated with the uplink beam based at least in part on the cross-link interference strength satisfying a threshold.

In a ninth aspect, alone or in combination with one or more of the first through eighth aspects, the cross-link interference information is transmitted using the transmit power associated with the uplink beam based at least in part on a configuration for the sidelink channel sharing a carrier with a Uu interface that the victim UE is to use to communicate with a base station.

In a tenth aspect, alone or in combination with one or more of the first through ninth aspects, the cross-link interference information is transmitted using a transmit power associated with a sidelink beam to explicitly indicate at least a portion of the cross-link interference information.

In an eleventh aspect, alone or in combination with one or more of the first through tenth aspects, the cross-link interference information is transmitted using the transmit power associated with the sidelink beam based at least in part on the cross-link interference strength failing to satisfy a threshold.

In a twelfth aspect, alone or in combination with one or more of the first through eleventh aspects, the cross-link interference information is transmitted using the transmit power associated with the sidelink beam based at least in part on a lack of one or more of feedback from the aggressor UE or interference elimination by the aggressor UE following a previous transmission of the cross-link interference information using a transmit power associated with an uplink beam.

In a thirteenth aspect, alone or in combination with one or more of the first through twelfth aspects, the cross-link interference information is transmitted using the transmit power associated with the sidelink beam based at least in part on the sidelink channel having a dedicated carrier configuration.

In a fourteenth aspect, alone or in combination with one or more of the first through thirteenth aspects, the sidelink channel used to transmit the cross-link interference information is a PSCCH based at least in part on the cross-link interference information having a size that fails to satisfy a threshold.

In a fifteenth aspect, alone or in combination with one or more of the first through fourteenth aspects, the sidelink channel used to transmit the cross-link interference information is a PSSCH based at least in part on the cross-link interference information having a size that satisfies a threshold.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
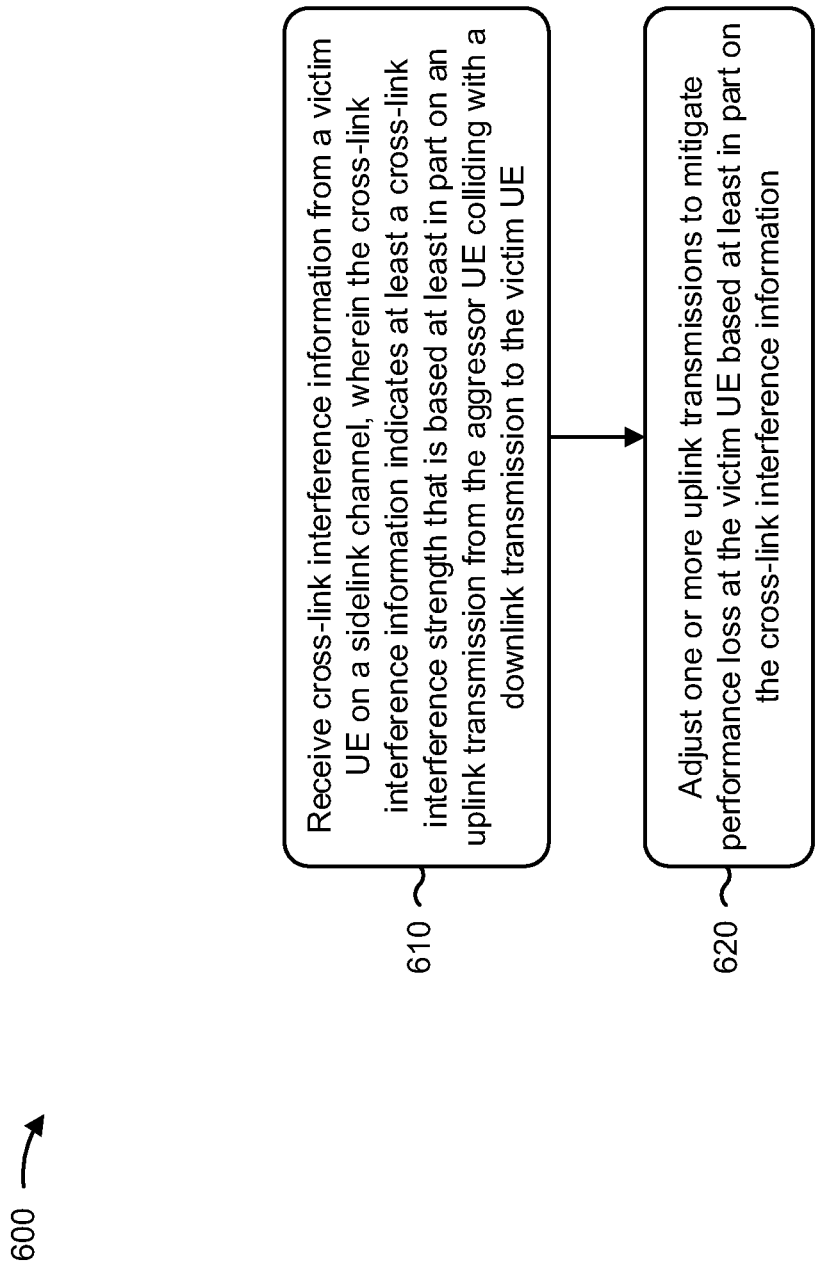
FIG. 6 is a diagram illustrating an example process performed, for example, by an aggressor UE, in accordance with various aspects of the present disclosure.

FIG. 6 is a diagram illustrating an example process 600 performed, for example, by an aggressor UE, in accordance with various aspects of the present disclosure. Example process 600 is an example where the aggressor UE (e.g., UE 120, aggressor UE 120*agg*, and/or the like) performs operations associated with sidelink transmission of cross-link interference information by a victim UE.

As shown in FIG. 6, in some aspects, process 600 may include receiving cross-link interference information from a victim UE on a sidelink channel, wherein the cross-link interference information indicates at least a cross-link interference strength that is based at least in part on an uplink transmission from the aggressor UE colliding with a downlink transmission to the victim UE (block 610). For example, the aggressor UE may receive (e.g., using antenna 252, DEMOD 254, MIMO detector 256, receive processor 258, controller/processor 280, memory 282, and/or the like) cross-link interference information from a victim UE on a sidelink channel, as described above, for example, with reference to FIG. 3 and/or FIG. 4. In some aspects, the cross-link interference information indicates at least a cross-link interference strength that is based at least in part on an uplink transmission from the aggressor UE colliding with a downlink transmission to the victim UE.

As further shown in FIG. 6, in some aspects, process 600 may include adjusting one or more uplink transmissions to mitigate performance loss at the victim UE based at least in part on the cross-link interference information (block 620). For example, the aggressor UE (e.g., using controller/processor 280, transmit processor 264, TX MIMO processor 266, MOD 254, antenna 252, and/or the like) may adjust one or more uplink transmissions to mitigate performance loss at the victim UE based at least in part on the cross-link interference information, as described above, for example, with reference to FIG. 3 and/or FIG. 4.

Process 600 may include additional aspects, such as any single aspect or any combination of aspects described below and/or in connection with one or more other processes described elsewhere herein.

In a first aspect, process 600 includes receiving, from the victim UE, information scheduling transmission of the cross-link interference information via a PSCCH.

In a second aspect, alone or in combination with the first aspect, process 600 includes receiving, from a base station, configuration information for the sidelink channel, where the cross-link interference information is received from the victim UE based at least in part on the configuration information for the sidelink channel.

In a third aspect, alone or in combination with one or more of the first and second aspects, the cross-link interference strength is based at least in part on a received signal strength indicator, a reference signal received power, and/or a physical layer parameter measured in one or more symbols in which the uplink transmission from the aggressor UE collides with the downlink transmission to the victim UE.

In a fourth aspect, alone or in combination with one or more of the first through third aspects, the cross-link interference information received from the victim UE further indicates a frequency bandwidth in which the cross-link interference strength is measured.

In a fifth aspect, alone or in combination with one or more of the first through fourth aspects, the cross-link interference information received from the victim UE further indicates one or more symbols in which the uplink transmission from the aggressor UE collides with the downlink transmission to the victim UE.

In a sixth aspect, alone or in combination with one or more of the first through fifth aspects, the cross-link interference information received from the victim UE further indicates a time division multiplexing pattern that includes one or more downlink symbols for the victim UE.

In a seventh aspect, alone or in combination with one or more of the first through sixth aspects, the cross-link interference information is transmitted using a transmit power associated with an uplink beam to implicitly indicate at least a portion of the cross-link interference information.

In an eighth aspect, alone or in combination with one or more of the first through seventh aspects, the cross-link interference information is transmitted using a transmit power associated with a sidelink beam to explicitly indicate at least a portion of the cross-link interference information.

In a ninth aspect, alone or in combination with one or more of the first through eighth aspects, the sidelink channel used to transmit the cross-link interference information includes one or more of a PSCCH or a PSSCH.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a base station, in accordance with various aspects of the present disclosure. Example process 700 is an example where the base station (e.g., base station 110 and/or the like) performs operations associated with sidelink transmission of cross-link interference information by a victim UE.

As shown in FIG. 7, in some aspects, process 700 may include receiving, from a victim UE, information related to cross-link interference experienced at the victim UE, wherein the cross-link interference is based at least in part on an uplink transmission from an aggressor UE colliding with a downlink transmission to the victim UE (block 710). For example, the base station may receive (e.g., using antenna 234, DEMOD 232, MIMO detector 236, receive processor 238, controller/processor 240, and/or the like), from a victim UE, information related to cross-link interference experienced at the victim UE, as described above, for example, with reference to FIG. 3 and/or FIG. 4. In some aspects, the cross-link interference is based at least in part on an uplink transmission from an aggressor UE colliding with a downlink transmission to the victim UE.

As further shown in FIG. 7, in some aspects, process 700 may include transmitting, to the victim UE and the aggressor UE, configuration information for a sidelink channel to enable direct transmission of the information related to the cross-link interference from the victim UE to the aggressor UE via the sidelink channel (block 720). For example, the base station may transmit (e.g., using controller/processor 240, transmit processor 220, TX MIMO processor 230, MOD 232, antenna 234, and/or the like), to the victim UE and the aggressor UE, configuration information for a sidelink channel to enable direct transmission of the information related to the cross-link interference from the victim UE to the aggressor UE via the sidelink channel, as described above, for example, with reference to FIG. 3 and/or FIG. 4.

Process 700 may include additional aspects, such as any single aspect or any combination of aspects described above and/or in connection with one or more other processes described elsewhere herein.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a victim user equipment (UE), comprising:
   measuring a cross-link interference strength from an aggressor UE based at least in part on an uplink transmission from the aggressor UE colliding with a downlink transmission to the victim UE; and
   transmitting, using a transmit power, cross-link interference information to the aggressor UE on a sidelink channel, wherein the cross-link interference information transmitted to the aggressor UE indicates at least the cross-link interference strength, and wherein the transmit power is based at least in part on the cross-link interference strength, and wherein the sidelink channel used to transmit the cross-link interference information is based at least in part on the cross-link interference information having a size that fails to satisfy a threshold.

2. The method of claim 1, further comprising:
   transmitting, to the aggressor UE, information scheduling transmission of the cross-link interference information via a physical sidelink control channel.

3. The method of claim 1, further comprising:
   transmitting, to a base station, information related to the cross-link interference strength from the aggressor UE; and
   receiving, from the base station, configuration information for the sidelink channel used to transmit the cross-link interference information, wherein the cross-link interference information is transmitted to the aggressor UE based at least in part on the configuration information for the sidelink channel used to transmit the cross-link interference information.

4. The method of claim 1, wherein the cross-link interference strength is based at least in part on one or more of a received signal strength indicator, a reference signal received power, or a physical layer parameter measured in one or more symbols in which the uplink transmission from the aggressor UE collides with the downlink transmission to the victim UE.

5. The method of claim 1, wherein the cross-link interference information transmitted to the aggressor UE further indicates a frequency bandwidth in which the cross-link interference strength is measured.

6. The method of claim 1, wherein the cross-link interference information transmitted to the aggressor UE further indicates one or more symbols in which the uplink transmission from the aggressor UE collides with the downlink transmission to the victim UE.

7. The method of claim 1, wherein the cross-link interference information transmitted to the aggressor UE further indicates a time division multiplexing pattern that includes one or more downlink symbols for the victim UE.

8. The method of claim 1, wherein the cross-link interference information is transmitted using the transmit power to implicitly indicate at least a portion of the cross-link interference information, wherein the transmit power is associated with an uplink beam.

9. The method of claim 8, wherein the cross-link interference information is transmitted using the transmit power based at least in part on the cross-link interference strength satisfying an other threshold, wherein the transmit power is associated with the uplink beam.

10. The method of claim 8, wherein the cross-link interference information is transmitted using the transmit power based at least in part on a configuration for sharing a carrier with a Uu interface that the victim UE is to use to communicate with a base station, wherein the transmit power is associated with the uplink beam.

11. The method of claim 1, wherein the cross-link interference information is transmitted using the transmit power to explicitly indicate at least a portion of the cross-link interference information, wherein the transmit power is associated with a sidelink beam.

12. The method of claim 11, wherein the cross-link interference information is transmitted using the transmit power based at least in part on the cross-link interference strength failing to satisfy an other threshold, wherein the transmit power is associated with the sidelink beam.

13. The method of claim 11, wherein the cross-link interference information is transmitted using the transmit power based at least in part on a lack of one or more of feedback from the aggressor UE or interference elimination by the aggressor UE following a previous transmission of the cross-link interference information using a transmit power of an uplink beam, wherein the transmit power is associated with the sidelink beam.

14. The method of claim 11, wherein the cross-link interference information is transmitted using the transmit power based at least in part on the sidelink channel used to transmit the cross-link interference information having a dedicated carrier configuration, wherein the transmit power is associated with the sidelink beam.

15. The method of claim 1, wherein the sidelink channel used to transmit the cross-link interference information is a physical sidelink control channel based at least in part on the cross-link interference information having the size that fails to satisfy the threshold.

16. The method of claim 1, wherein the sidelink channel used to transmit the cross-link interference information is a physical sidelink shared channel based at least in part on the cross-link interference information having a size that satisfies the threshold.

17. A victim user equipment (UE) for wireless communication, comprising:
a memory; and
one or more processors operatively coupled to the memory, the memory and the one or more processors configured to:
measure a cross-link interference strength from an aggressor UE based at least in part on an uplink transmission from the aggressor UE colliding with a downlink transmission to the victim UE; and
transmit, using a transmit power, cross-link interference information to the aggressor UE on a sidelink channel, wherein the cross-link interference information transmitted to the aggressor UE indicates at least the cross-link interference strength, and wherein the transmit power is based at least in part on the cross-link interference strength, and wherein the sidelink channel used to transmit the cross-link interference information is based at least in part on the cross-link interference information having a size that fails to satisfy a threshold.

18. The victim UE of claim 17, wherein the memory and the one or more processors are further configured to:
transmit, to a base station, information related to the cross-link interference strength from the aggressor UE; and
receive, from the base station, configuration information for the sidelink channel, wherein the cross-link interference information is transmitted to the aggressor UE based at least in part on the configuration information for the sidelink channel.

19. The victim UE of claim 17, wherein the cross-link interference information transmitted to the aggressor UE further indicates one or more of:
a frequency bandwidth in which the cross-link interference strength is measured,
one or more symbols in which the uplink transmission from the aggressor UE collides with the downlink transmission to the victim UE, or
a time division multiplexing pattern that includes one or more downlink symbols for the victim UE.

20. The victim UE of claim 17, wherein the cross-link interference information is transmitted using the transmit power to implicitly indicate at least a portion of the cross-link interference information or to explicitly indicate at least the portion of the cross-link interference information, wherein the transmit power is associated with an uplink beam or associated with a sidelink beam.

21. A method of wireless communication performed by an aggressor user equipment (UE), comprising:
receiving cross-link interference information from a victim UE on a sidelink channel, wherein the cross-link interference information indicates at least a cross-link interference strength that is based at least in part on an uplink transmission from the aggressor UE colliding with a downlink transmission to the victim UE, and wherein a received power of the cross-link interference information is based at least in part on the cross-link interference strength, and wherein the sidelink channel used to receive the cross-link interference information is based at least in part on the cross-link interference information having a size that fails to satisfy a threshold; and
adjusting one or more uplink transmissions to mitigate performance loss at the victim UE based at least in part on the cross-link interference information.

22. The method of claim 21, further comprising:
receiving, from the victim UE, information scheduling transmission of the cross-link interference information via a physical sidelink control channel.

23. The method of claim 21, further comprising:
receiving, from a base station, configuration information for the sidelink channel used to receive the cross-link interference information, wherein the cross-link interference information is received from the victim UE based at least in part on the configuration information for the sidelink channel used to receive the cross-link interference information.

24. The method of claim 21, wherein the cross-link interference strength is based at least in part on one or more of a received signal strength indicator, a reference signal received power, or a physical layer parameter measured in one or more symbols in which the uplink transmission from the aggressor UE collides with the downlink transmission to the victim UE.

25. The method of claim 21, wherein the cross-link interference information received from the victim UE further indicates a frequency bandwidth in which the cross-link interference strength is measured.

26. The method of claim 21, wherein the cross-link interference information received from the victim UE further indicates one or more symbols in which the uplink transmission from the aggressor UE collides with the downlink transmission to the victim UE.

27. The method of claim 21, wherein the cross-link interference information received from the victim UE further indicates a time division multiplexing pattern that includes one or more downlink symbols for the victim UE.

28. The method of claim 21, wherein the received power of the cross-link interference information is associated with an uplink beam to implicitly indicate at least a portion of the cross-link interference information.

29. The method of claim 21, wherein the received power of the cross-link interference information is associated with a sidelink beam to explicitly indicate at least a portion of the cross-link interference information.

30. The method of claim 21, wherein the sidelink channel used to transmit receive the cross-link interference information includes one or more of a physical sidelink control channel or a physical sidelink shared channel.

31. An aggressor user equipment (UE) for wireless communication, comprising:
a memory; and
one or more processors operatively coupled to the memory, the memory and the one or more processors configured to:
receive cross-link interference information from a victim UE on a sidelink channel, wherein the cross-link interference information indicates at least a cross-link interference strength that is based at least in part on an uplink transmission from the aggressor UE colliding with a downlink transmission to the victim UE, and wherein a received power of the cross-link interference information is based at least in part on the cross-link interference strength, and wherein the sidelink channel used to receive the cross-link interference information is based at least in part on the cross-link interference information having a size that fails to satisfy a threshold; and
adjust one or more uplink transmissions to mitigate performance loss at the victim UE based at least in part on the cross-link interference information.

32. The aggressor UE of claim 31, wherein the memory and the one or more processors are further configured to:

receive, from a base station, configuration information for the sidelink channel, wherein the cross-link interference information is received from the victim UE based at least in part on the configuration information for the sidelink channel.

33. The aggressor UE of claim 31, wherein the cross-link interference information received from the victim UE further indicates one or more of:
- a frequency bandwidth in which the cross-link interference strength is measured,
- one or more symbols in which the uplink transmission from the aggressor UE collides with the downlink transmission to the victim UE, or
- a time division multiplexing pattern that includes one or more downlink symbols for the victim UE.

34. The aggressor UE of claim 31, wherein the the received power is associated with an uplink beam or associated with a sidelink beam.

35. A method of wireless communication performed by a base station, comprising:

receiving, from a victim user equipment (UE), information related to cross-link interference experienced at the victim UE, wherein the cross-link interference is based at least in part on an uplink transmission from an aggressor UE colliding with a downlink transmission to the victim UE, and wherein a received power of the information related to cross-link interference is based at least in part on a strength of the cross-link interference; and transmitting, to the victim UE and the aggressor UE, configuration information for a sidelink channel to enable direct transmission of the information related to the cross-link interference from the victim UE to the aggressor UE via the sidelink channel, wherein the sidelink channel is based at least in part on the information related to the cross-link interference having a size that fails to satisfy a threshold.

* * * * *